(12) United States Patent
Han (10) Patent No.: US 11,216,114 B2
(45) Date of Patent: Jan. 4, 2022

(54) TOUCH SENSING DEVICE AND METHOD FOR AVOIDING NOISE IN TOUCH SENSING DEVICE

(71) Applicant: SILICON WORKS CO., LTD., Daejeon (KR)

(72) Inventor: Chan Hee Han, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/107,049

(22) Filed: Nov. 30, 2020

(65) Prior Publication Data
US 2021/0191562 A1 Jun. 24, 2021

(30) Foreign Application Priority Data

Dec. 24, 2019 (KR) .......................... 10-2019-0173696

(51) Int. Cl.
*G06F 3/041* (2006.01)
*G06F 3/044* (2006.01)

(52) U.S. Cl.
CPC ........ *G06F 3/0418* (2013.01); *G06F 3/04166* (2019.05); *G06F 3/044* (2013.01); *G06F 2203/04108* (2013.01)

(58) Field of Classification Search
CPC .... G06F 3/0418; G06F 3/04166; G06F 3/044; G06F 2203/04108
See application file for complete search history.

(56) References Cited

U.S. PATENT DOCUMENTS

| | | | |
|---|---|---|---|
| 9,547,396 B2 | 1/2017 | Wang et al. | |
| 10,620,722 B2 | 4/2020 | Liang et al. | |
| 10,627,957 B2 | 4/2020 | Khazeni et al. | |
| 2013/0257765 A1* | 10/2013 | Lee | G06F 3/04166 345/173 |
| 2014/0198053 A1* | 7/2014 | Yoon | G06F 3/047 345/173 |

* cited by examiner

*Primary Examiner* — Michael Pervan
(74) *Attorney, Agent, or Firm* — Fenwick & West LLP

(57) ABSTRACT

The present disclosure relates to a touch sensing technology for sensing noise in order to avoid the noise, which allows previously prevent the possibility that a frequency of a driving signal is changed in a predetermined order or at random by changing the frequency of the driving signal in conformity with a frequency least affected by the noise.

15 Claims, 7 Drawing Sheets

TOUCH SENSING DEVICE AND METHOD FOR AVOIDING NOISE IN TOUCH SENSING DEVICE

CROSS REFERENCE TO RELATED APPLICATION

This application claims priority from Republic of Korea Patent Application No. 10-2019-0173696, filed on Dec. 24, 2019, which is hereby incorporated by reference in its entirety.

BACKGROUND

1. Field of Technology

The present embodiment relates to a touch sensing technology for sensing and avoiding noise.

2. Description of the Prior Art

A technology for perceiving an external object that approaches or touches a touch panel is referred to as a touch sensing technology. The touch panel is placed on a plane in the same position as a display panel such that users can input a user manipulation signal through the touch panel while viewing images on the display panel. Such a user manipulation signal producing method provides a superior level of user intuitiveness compared with other conventional user manipulation signal input schemes (for example, a mouse input scheme or a keyboard input scheme).

As a result of such advantages, the touch sensing technology has been applied to various electronic devices including display panels. A touch sensing device may supply a driving signal to a driving electrode disposed in a touch panel and may receive a response signal formed in a sensing signal, thereby sensing a touch or the proximity of an external object to the touch panel. In the touch panel, a capacitance is formed between the driving electrode and the sensing electrode, and a change in the capacitance may indicate a touch or the proximity of the external object.

Meanwhile, noise may be included in the touch panel. When the external object contacts the same, noise may be delivered through the external noise, and the touch panel may accordingly malfunction.

According to a conventional approach to solve the problem of noise intervention, it is determined whether or not a driving signal has noise, and if the same has noise, the frequency of the driving signal is changed from the current frequency to a predefined frequency. For example, if three frequencies are used as driving signals in a predetermined order, one frequency is used to drive the touch electrode, and the remaining two frequencies are left idle. If the first used frequency has noise, one of the remaining two frequencies is selected according to the order and used to drive the touch electrode. If the selected frequency also comes to have noise, the last one frequency is used.

Such a conventional method has a problem in that, since the frequency of the driving signal is changed in a predetermined order, the same may fail to consider whether or not new frequencies introduced for the frequency change have noise or not. In other words, new frequencies may also have noise. In addition, if new frequencies have noise, the process may become inefficient due to frequent operations of switching to a different frequency.

In this regard, the present embodiment seeks to provide a technology for effectively avoiding noise occurring during touch sensing.

SUMMARY

An aspect of the present disclosure is to provide a technology for measuring noise regarding a separate frequency in advance and driving a touch electrode by a driving signal with a frequency having the least noise.

To this end, in an aspect, the present disclosure provides a touch sensing device including: a driving circuit configured to drive touch electrodes by a driving signal having a first frequency in order to sense a touch or the proximity of an external object, and to drive the electrode by a driving signal having a second frequency in order to measure noise; a sensing circuit configured to receive response signals having the first and second frequencies in response to the driving signals having the first and second frequencies; and a noise control circuit configured to acquire measurement data regarding the result of measuring noise of the response signal having the second frequency in advance, configured to determine whether or not the response signal having the first frequency has noise, and configured to determine, from the measurement data, whether or not to use the driving signal having the second frequency to sense the touch or the approach of an external object according to the result of determination.

In the device, the driving circuit may drive the touch electrode by a driving signal having a third frequency; the sensing circuit may receive a response signal having the third frequency in response to the driving signal having the third frequency; and if the response signal having the first frequency has noise, the noise control circuit may determine, from the measurement data, a frequency having the least noise among the second and third frequencies.

The device may further comprise a storage circuit for storing the measurement data, and the noise control circuit may determine, from the stored measurement data, a frequency having the least noise.

In the device, the measurement data may be generated and stored in advance before the touch electrode is driven by the driving signal having the first frequency.

In the device, the second frequency may be selected as the frequency having the least noise; the driving circuit may drive the touch electrode by the driving signal having the second frequency in order to sense a touch or the proximity of the external object, and may drive the touch electrode by the driving signals having the first and third frequencies in order to measure noise; the noise control circuit may acquire measurement data regarding the result of measuring noise of the response signals having the first and third frequencies, in advance; the noise control circuit may determine whether or not the response signal having the second frequency has noise; and if the response signal having the second frequency has noise, the noise control circuit may determine, from the measurement data, a frequency having the least noise among the first and third frequencies.

In the device, the noise control circuit may determine that, if the noise level exceeds a threshold value, the response signal having the first frequency has noise.

In the device, if the response signal having the first frequency has noise, the noise control circuit may compare noise of the response signal having the first frequency with noise of the response signals having the second and third frequencies; and if the noise of the response signal having the first frequency is less than the noise of the response signals having the second and third frequencies, the noise control circuit may deliver a frequency maintaining signal to the control circuit such that the driving circuit keeps receiving the driving signal having the first frequency.

In the device, the driving circuit may drive the touch electrode by a driving signal with the first frequency in order to sense the touch or approach of an external object in first multiple touch sections of one frame, and may drive the touch electrode by driving signals respectively with the second and third frequencies in order to measure noise in second multiple touch sections of the one frame. The noise control circuit may measure noise of the response signals having the second and third frequencies in the second multiple touch sections.

In the device, the driving circuit may drive the touch electrode by a driving signal with one of the second and third frequencies in order to measure noise in the second multiple touch sections. The noise control circuit may measure noise of one of the second and third frequencies in the second multiple touch sections.

In the device, a touch or the proximity of a finger may be sensed in the first multiple touch sections or the second multiple touch sections.

In the device, first multiple touch sections and the second multiple touch sections may be long horizontal blanks (LBH).

In another aspect, the present disclosure provides a method for avoiding noise in a touch sensing device, the method including the steps of: driving a touch electrode by a driving signal having a first frequency for noise measurement; receiving a response signal having the first frequency in response to the driving signal having the first frequency; acquiring measurement data regarding a result of measuring noise of the response signal having the first frequency; driving the touch electrode by a driving signal having a second frequency in order to sense a touch or the proximity of an external object; determining whether or not a response signal to the driving signal having the second frequency has noise; and determining whether or not to use the driving signal having the first frequency to sense the touch or approach of an external object according to the measurement data for the first frequency when the response signal to the driving signal having the second frequency is determined to have noise.

In the method for avoiding noise, acquiring measurement data for the first frequency may precede determining whether or not a response signal to the driving signal having the second frequency has noise.

In the method for avoiding noise, a time during which the touch electrode is driven by the driving signal having the first frequency may be shorter than a time during which the touch electrode is driven by the driving signal having the second frequency.

In the method for avoiding noise, when the touch sensing device drives the touch electrode by the driving signal having the first frequency, at least two touch electrodes may be short-circuited and driven.

In the method for avoiding noise, the touch sensing device may drive the touch electrode by the driving signal having the second frequency in a long horizontal blank (LHB).

In still another aspect, the present disclosure provides a touch sensing device comprising: a driving circuit to drive touch electrodes by frame comprising multiple display sections, multiple first touch sections, and multiple second touch sections, the driving circuit being configured to drive touch electrodes by a first driving signal in the first touch sections and to drive the touch electrodes by a second driving signal and a third driving signal in the second touch sections, the first driving signal, the second driving signal, and the third driving signal having different frequencies; a sensing circuit configured to sense a touch or the proximity of an external object by using sensing data of the touch electrodes generated according to the first driving signal; and a noise control circuit configured to change a frequency of the first driving signal to a frequency of one, having less noise, of the second driving signal and the third driving signal if the sensing data is determined to have noise.

The first touch section or the second touch section may be disposed between two display sections so as that touch sections and display sections are alternately disposed.

The first touch section may correspond to a long horizontal blank (LHB).

The second touch section may be divided into a section for the second driving signal and a section for the third driving signal, and the first touch section may be longer than the section for the second driving signal and/or the section for the third driving signal.

The driving circuit may individually drive respective touch electrodes in the first touch section, and may short-circuit and drive at least two touch electrodes in the second touch section.

The noise control circuit may generate noise measurement data regarding the second driving signal and the third driving signal, and may select one having less noise among the second driving signal and the third driving signal according to the noise measurement data.

The touch sensing device may further include a storage circuit for storing the noise measurement data, and the noise control circuit may determine a frequency having the least noise from the stored noise measurement data.

The noise measurement data may be generated and stored in advance before the touch electrodes are driven by the first driving signal.

The noise control circuit may determine that, if a noise level exceeds a threshold value, a response signal to the first driving signal from a touch electrode has noise.

The noise control circuit may compare a noise level regarding the first driving signal with a noise level of the second driving signal and a noise level of the third driving signal, and may maintain the frequency of the first driving signal if the noise level of the first driving signal is lower than the noise level of the second driving signal and the noise level of the third driving signal.

A touch or the proximity of a finger may be sensed in the multiple first touch sections.

As described above, according to the present disclosure, data of noise levels of respective frequencies can be obtained in advance so that the frequency of the driving signal can be changed to a frequency having the least noise.

In addition, according to the present disclosure, it is possible to previously prevent the possibility that the frequency is changed in a predetermined order or at random, without considering a noise level of each frequency.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
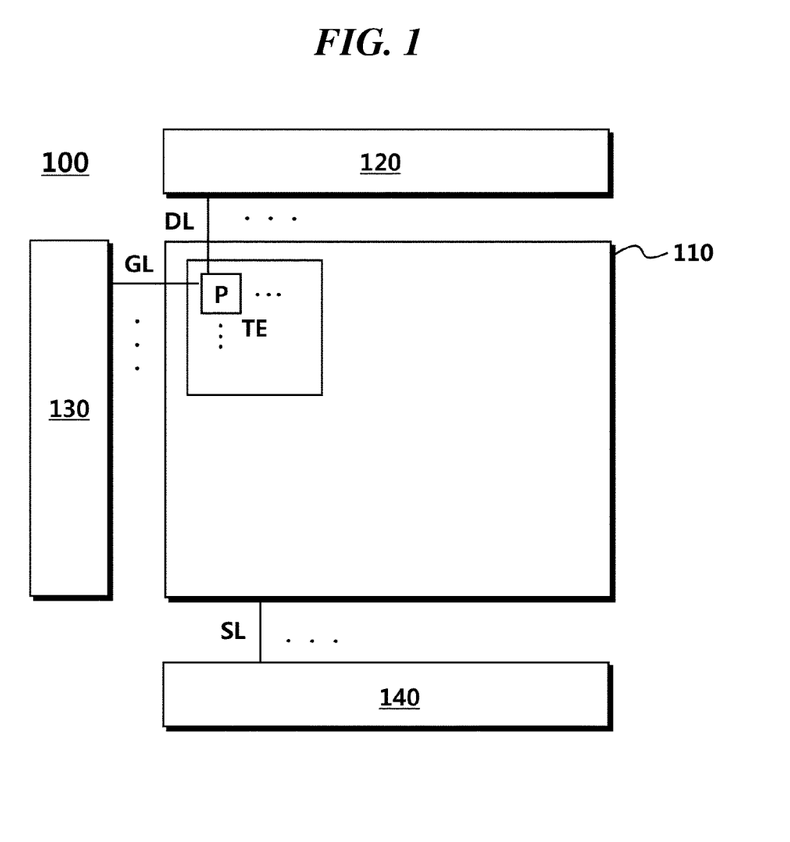
FIG. 1 is a diagram illustrating the configuration of a display device according to an embodiment.

FIG. 1 is a diagram illustrating the configuration of a display device according to an embodiment.

Referring to FIG. 1, the display device 100 includes a panel 110, a data driving device 120, a gate driving device 130, a touch sensing device 140, and the like.

The panel 110 may have multiple data lines DL formed thereon and connected to the data driving device 120, and may have multiple gate lines GL formed thereon and connected to the gate driving device 130. In addition, the panel 110 may have multiple pixels P defined so as to correspond to points of intersection between the multiple data lines DL and the multiple gate lines GL, respectively.

A transistor may be formed at each pixel P so as to have a first electrode (for example, a source electrode or a drain electrode) connected to a data line DL, to have a gate electrode connected to a gate line GL, and to have a second electrode (for example, a drain electrode or a source electrode) connected to a display electrode.

In addition, the panel 110 may have multiple touch electrodes TE additionally formed thereon and spaced apart from each other. One pixel P or multiple pixels P may be positioned in the area in which the touch electrodes TE are positioned.

The panel 110 may include a display panel and a touch screen panel (TSP), and the display panel and the TSP may share some components with each other. For example, the multiple touch electrodes TE may constitute a component (for example, a common electrode for applying a common voltage) of the display panel and may also constitute a component (a touch electrode for sensing a touch) of the TSP. Given that the display panel and the TSP share some components with each other, such a panel 110 may be referred to an integrated panel, but the present disclosure is not limited thereto. In addition, an in-cell panel is known as such a type of panel (including a display panel and a TSP sharing some components with each other), but is only an example of the above-mentioned panel 110, and the type of panel to which the present disclosure is applied is not limited to such an in-cell panel.

The data driving device 120 is configured to supply a data signal through the data lines DL such that respective pixels P display images.

The data driving device 120 may include at least one data driver integrated circuit. The at least one data driver integrated circuit may be connected to a bonding pad of the panel 110 in a tape automated bonding (TAB) type or in a chip-on-glass (COG) type, or may be directly formed on the panel 110. If necessary, the data driving device 120 may be formed to be integrated with the panel 110. In addition, the data driving device 120 may be implemented in a chip-on-film (COF) type.

The gate driving device 130 is configured to sequentially supply scan signals through the gate lines GL in order to turn on or off transistors in respective pixels P.

The gate driving device 130 may be positioned only on one side of the panel 110 as illustrated in the diagram, depending on the driving scheme, or two separate gate driving devices 130 may be positioned on both sides of the panel 110, respectively.

In addition, the gate driving device 130 may include at least one gate driver integrated circuit. The at least one gate driver integrated circuit may be connected to a bonding pad of the panel 110 in a TAB type or in a COG type. Alternatively, the gate driving device 130 may be implemented in a gate-in-panel (GIP) type and directly formed on the panel 110. If necessary, the gate driving device 130 may be formed to be integrated with the panel 110. In addition, the gate driving device 130 may be implemented in a COF type.

The touch sensing device 140 is configured to apply a driving signal to all or some of the multiple touch electrodes TE connected to sensing lines SL.

The touch sensing device 140 may be configured separately from and positioned outside the data driving device 120 and the gate driving device 130 as illustrated in the diagram. The touch sensing device 140 may also be configured as an internal component of a separate driver integrated circuit including at least one of the data driving device 120 and the gate driving device 130, depending on the manner of implementation. Alternatively, the touch sensing device 140 may be configured as an internal component of the data driving device 120 or the gate driving device 130.

Therefore, the description that the touch sensing device 140 applies a driving signal to all or some of the multiple touch electrodes TE may also be regarded as meaning that a separate driver integrated circuit including the touch sensing device 140 applies a driving signal to all or some of the multiple touch electrodes TE. In addition, the description may also be regarded as meaning, depending on the design scheme, that the data driving device 120 or the gate driving device 130, which includes the touch sensing device 140, applies a driving signal to all or some of the multiple touch electrodes TE.

The manner of implementation and design of the touch sensing device 140 is not limited in any manner. The touch sensing device 140 may be a separate component itself or a component positioned inside or outside the separate component, as long as the same performs functions identical or similar to those described herein.

In addition, although one touch sensing device 140 is illustrated in the diagram as being positioned in the display device 100, the display device 100 may include two or more touch sensing devices 140.

Meanwhile, in order for the touch sensing device 140 to apply a driving signal to all or some of the multiple touch electrodes TE, sensing lines SL need to be connected to the multiple touch electrodes TE, respectively. Accordingly, sensing lines SL may be formed on the panel 110 in a first direction (for example, vertical direction) or in a second direction (for example, horizontal direction) and connected to the multiple touch electrodes TE, respectively, so as to deliver a driving signal.

Meanwhile, the display device 100 may adopt a capacitive touch scheme such that the approach or touch of an external object can be recognized by detecting a change in the capacitance through the touch electrodes TE.

Such a capacitive touch scheme may be classified, for example, into a mutual capacitance touch scheme and a self-capacitance touch scheme.

According to the mutual capacitance touch scheme, which is a type of capacitive touch scheme, a driving signal is applied to a touch electrode (Tx electrode), and another touch electrode (Rx electrode) mutually coupled with the Tx electrode is sensed. According to the mutual capacitance touch scheme, since a value sensed in the Rx electrode varies depending on the proximity or a touch of an external object such as a finger or a pen, detecting whether or not there is a touch, obtaining touch coordinates, or the like can be performed using the value sensed in the RX electrode.

According to the self-capacitance touch scheme, which is another type of capacitive touch scheme, a driving signal is applied to a touch electrode TE, and the touch electrode TE is again sensed. According to the self-capacitance touch scheme, since a value sensed in the touch electrode TE varies depending on the proximity or a touch of an external object such as a finger or a pen, detecting whether or not there is a touch, obtaining touch coordinates, or the like can be performed using such a value. In the self-capacitance touch scheme, the touch electrode TE, to which a driving signal is applied, is identical to the touch electrode TE which is sensed, that is, there is no distinction between a Tx electrode and an Rx electrode.

The display device 100 may adopt one of the two above-mentioned capacitive touch schemes (mutual capacitance touch scheme and self-capacitance touch scheme). It will be assumed in the following description of an embodiment, for convenience of description, that the self-capacitance touch scheme is adopted.

Meanwhile, the display device 100 may distinguish between a display section and a touch section and accordingly drive the touch electrodes TE. For example, the touch sensing device 140 of the display device 100 may not apply a driving signal to all or some of the touch electrodes TE in a section in which a data signal is supplied.

In addition, the display device 100 may drive the touch electrodes TE without distinguishing between a display section and a touch section. For example, the touch sensing device 140 of the display device 100 may apply a driving signal to all or some of the touch electrodes TE in a section in which a data signal is supplied.

Figure 2:
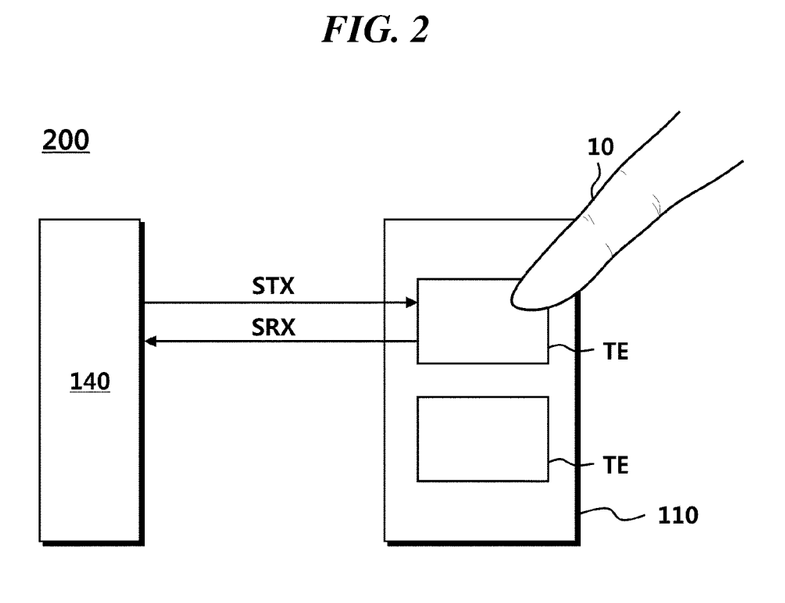
FIG. 2 is a diagram schematically illustrating a touch sensing system according to the present disclosure.

FIG. 2 is a diagram schematically illustrating a touch sensing system according to the present disclosure.

Referring to FIG. 2, the touch sensing system 200 may include a panel 110 and a touch sensing device 140.

The panel 110 may have multiple touch electrodes TE disposed thereon.

The touch sensing device 140 may supply a driving signal STX to the touch electrodes TE. The driving signal STX may be a voltage-type or current-type signal, and a voltage-type driving signal STX may be defined as a driving voltage. The driving signal may include one driving period including a first term and a second term.

The touch sensing device 140 may receive a response signal SRX regarding the driving signal STX from the touch electrodes TE and may demodulate the response signal SRX, thereby sensing a touch or the proximity of an object 10 with regard to the panel 110. The response signal SRX may be a current-type or voltage-type signal.

Figure 3:
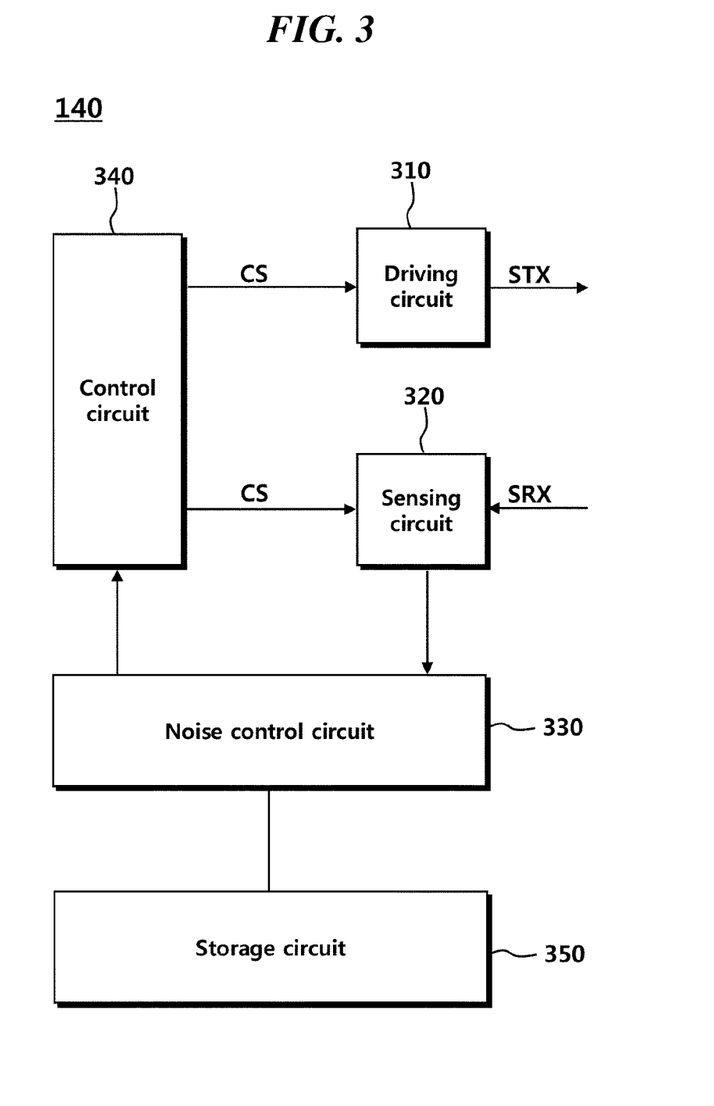
FIG. 3 is a diagram illustrating the configuration of a touch sensing device according to the present disclosure.

FIG. 3 is a diagram illustrating the configuration of a touch sensing device according to the present disclosure.

Referring to FIG. 3, the touch sensing device 140 may include a driving circuit 310, a sensing circuit 320, a noise control circuit 330, a control circuit 340, and a storage circuit 350.

The driving circuit 310 may supply a driving signal STX having a frequency to the touch electrodes TE. The driving circuit 310 may drive the touch electrodes by driving signals STX having different frequencies according to functions. For example, the driving circuit 310 may drive the touch electrodes by a driving signal STX having a first frequency in order to sense a touch or the proximity of an external object. The driving circuit 310 may drive the touch electrodes by a driving signal STX having a second frequency and a driving signal STX having a third frequency in order to measure noise.

The sensing circuit 320 may receive a response signal SRX regarding the driving signal STX from the touch electrodes TE. The sensing circuit 320 may receive response signals SRX, which have different frequencies according to functions, and which correspond to the driving signals STX. For example, the sensing circuit 320 may receive a response signal SRX having a first frequency in order to sense touch or the proximity of an external object. The sensing circuit 320 may receive a response signal SRX having a second frequency and a response signal SRX having a third frequency in order to measure noise.

The sensing circuit 320 may sensing a touch or the proximity of an external object with regard to the panel according to the response signal SRX. The sensing circuit 320 may generate sensing data according to the response signal SRX.

The sensing data may include a sensing value obtained by demodulating the response signal SRX. The sensing value may be a time integration value of the current or voltage of the response signal SRX, for example. The sensing value may be used to determine whether or not an object touches the touch panel, or to obtain touch coordinates. For example, it may be determined that, if the sensing value has a size larger than or smaller than that of a reference value, a touch by an external object has occurred.

The noise control circuit 330 may measure noise of a frequency for noise measurement and may generate measurement data regarding the measurement result. If the noise control circuit 330 determines that the current frequency of the driving signal STX has noise, the noise control circuit 330 may determine a frequency having the least noise from the measurement data and may control the control circuit 340 so as to drive the touch electrodes by a driving signal having the selected frequency.

Specifically, the noise control circuit 330 may receive a response signal SRX having a second frequency and a response signal SRX having a third frequency, for noise measurement, from the sensing circuit 320. The noise control circuit 330 may measure noise of the response signal SRX having the second frequency and the response signal SRX having the third frequency, and may generate measurement data regarding the measurement result. The noise control circuit 330 may store the measurement data in the storage circuit 350. The noise control circuit 330 may generate and store the measurement data while the first frequency is used as the driving signal STX, or may generate and store the same in advance prior thereto. The noise control circuit 330 may measure the noise level regarding the second frequency and the third frequency in advance, thereby identifying the noise state, in order to hedge against possible intervention of noise in the driving signal STX having the first frequency.

Thereafter, the noise control circuit 330 may determine whether or not the first frequency currently used to drive the touch electrodes has noise. The noise control circuit 330 may determine that, if the noise level of the driving signal STX having the first frequency exceeds a threshold value, the same has noise.

If the currently used first frequency has noise, the noise control circuit 330 may determine the frequency having the least noise, among the second frequency and the third frequency, from measurement data. The noise control circuit 330 may retrieve measurement data stored in the storage circuit 350 and may select one among the second frequency and the third frequency, from the retrieved data, as the frequency to replace the first frequency.

If the current frequency for driving the touch electrodes has noise, the noise control circuit 330 may transmit a frequency change signal to the control circuit 340 so as to supply a driving signal STX having a different frequency. For example, if a frequency having the least noise is selected as the second frequency, the noise control circuit 330 may generate a frequency change signal instructing that the frequency of the driving signal STX be changed from the first frequency to the second frequency, and may transmit the same to the control circuit 340. The control circuit 340 may supply a driving signal STX having the second frequency to the driving circuit 310.

If a driving signal STX having a frequency has noise, and if the frequency is accordingly replaced with another frequency, the noise control circuit 330 may measure noise regarding the replaced frequency. For example, if a driving signal STX having a first frequency has been driving the touch electrodes, and if the first frequency is replaced with a second frequency, the noise control circuit 330 may measure noise regarding the response signal SRX having the first frequency and the response signal SRX having the third frequency. The noise control circuit 330 may store the result of measuring noise of the first and third frequencies in the storage circuit 350. Measurement of noise of the first and third frequencies may be performed while a driving signal STX having the second frequency drives the touch electrodes. That is, noise of the first and third frequencies may be measured in a partial touch section in which driving of the touch electrodes is suspended.

Meanwhile, even if the current frequency for driving the touch electrodes has noise, the noise control circuit 330 may transmit a frequency maintaining signal, instead of transmitting a frequency change signal, such that the driving signal STX having the current frequency is maintained. For example, if a response signal SRX having a first frequency has noise, the noise control circuit 330 may compare the noise level of the first frequency with the noise level of a second frequency and the noise level of a third frequency. If the noise level of the first frequency is lower than the noise level of the second frequency and the noise level of the third frequency, the noise control circuit 330 may determine to maintain the driving signal STX having the first frequency. The noise control circuit 330 may transmit a frequency maintaining signal including information indicating maintenance of the driving signal STX having the first frequency to the control circuit 340.

The control circuit 340 may supply a driving signal STX to the driving circuit 310. If the control circuit 340 receives a request for change of the frequency of the driving signal STX (frequency change signal) from the noise control circuit 330, the control circuit 340 may generate a driving signal STX having a frequency conforming to the request and may supply the same to the driving circuit 310. For example, if a frequency having the least noise is selected as a second frequency, the control circuit 340 may generate a driving signal STX having the second frequency and may transmit the same to the driving circuit 310. Thereafter, the driving circuit 310 may drive the touch electrodes by a driving signal STX having the second frequency instead of the first frequency.

The control circuit 340 may generate a control signal CS in order to control the driving circuit 310 and the sensing circuit 320. If the control circuit 340 delivers the control signal CS to the driving circuit 310 and the sensing circuit 320, the driving circuit 310 and the sensing circuit 320 may operate according to the control signal CS.

The storage circuit 350 may store the result of measuring noise of a frequency for noise measurement. For example, if a driving signal STX having a first frequency is currently used to drive the touch electrodes, results of measuring noise regarding second and third frequencies may be stored in the storage circuit 350. If the first frequency has noise, and if a driving signal STX having the second frequency is accordingly used to drive the touch electrodes, results of measuring noise regarding the first and third frequencies may be again stored in the storage 350.

Meanwhile, the touch panel may include multiple touch electrodes. During touch electrode driving for noise measurement, the touch sensing device 140 may concurrently drive the multiple touch electrodes. To this end, the touch sensing device 140 may further include a mux (not illustrated).

The mux may be provided in each channel including the driving circuit 310 and the sensing circuit 320. The mux may short-circuit each touch electrode. If the mux does not short-circuit each touch electrode, one channel individually drives touch electrodes through the driving circuit 310 and the sensing circuit 320. However, if the mux drives each touch electrode, one channel can concurrently drive multiple touch electrodes. This concurrent driving may be performed by frequency for noise measurement. The touch sensing device 140 may simultaneously transmit driving signals STX with a frequency for noise measurement to multiple touch electrodes, and may receive response signals SRX thereto. The touch sensing device 140 may measure noise of the response signals SRX.

Figure 4:
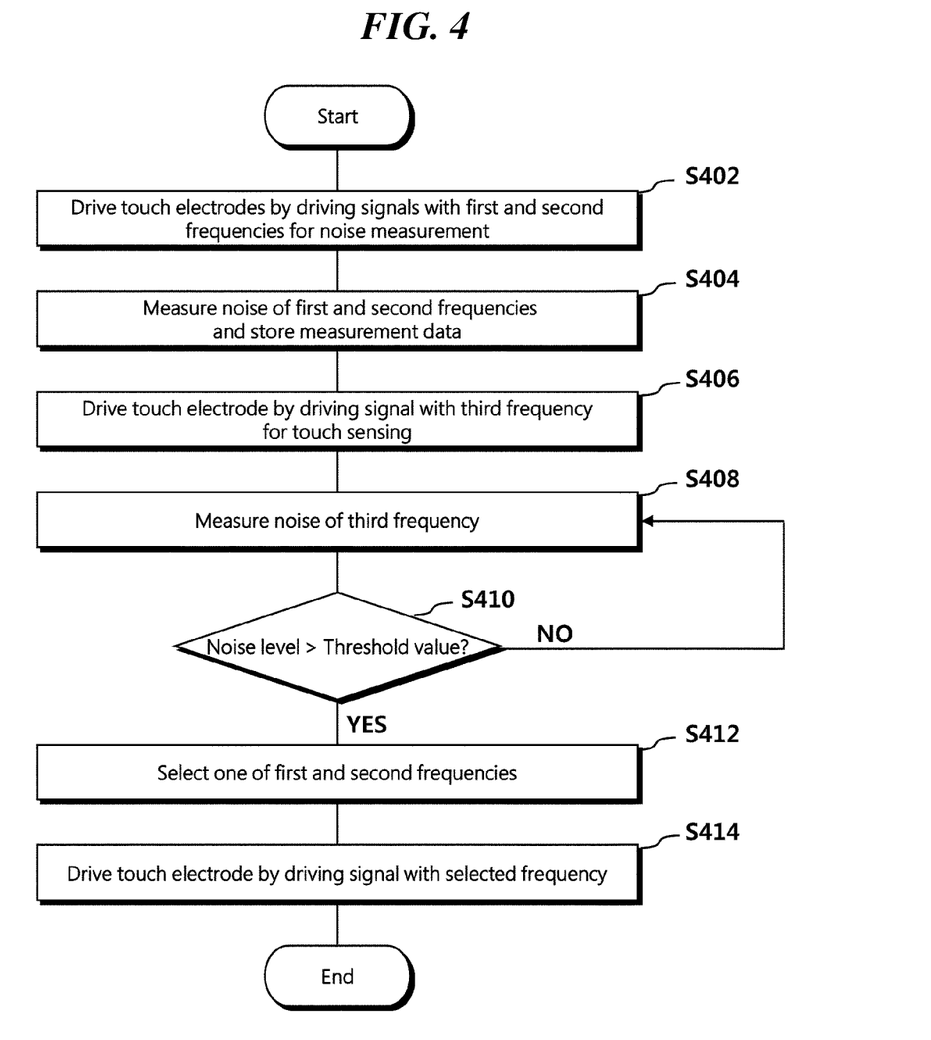
FIG. 4 is a first flowchart of noise avoiding operations according to an embodiment.

FIG. 4 is a first flowchart of noise avoiding operations according to an embodiment.

Referring to FIG. 4, a touch sensing device of a display device according to an embodiment may secure data in advance, the data being obtained by measuring noise of a different frequency while driving a touch electrode by the current frequency. If noise intervenes in the current frequency, the touch sensing device may determine a frequency having the least noise from the data, and may replace the frequency of a driving signal with the determined frequency.

A driving circuit 310 may drive a touch electrode by driving signals having first and second frequencies for noise measurement (S402).

A noise control circuit 330 may measure noise of the first and second frequencies and may store measurement data regarding the result of measuring the same in a storage circuit (S404). The noise control circuit 330 may receive response signals having the first and second frequencies from a sensing circuit, and may measure their noise levels.

For touch sensing, the driving circuit 310 may drive the touch electrode by a driving signal having a third frequency (S406).

The noise control circuit 330 may measure noise of the third frequency (S408).

The noise control circuit 330 may compare the noise level of the third frequency with a threshold value (S410).

If the noise level of the third frequency is not higher than the threshold value, the noise control circuit 330 may repeatedly measure noise of the third frequency (NO in S410).

If the noise level of the third frequency is higher than the threshold value (YES in S410), the noise control circuit 330 may select one of the first and second frequencies (S412). The noise control circuit 330 may read out stored measurement data and may select one having the lowest noise level, among the first and second frequencies, on the basis of the measurement data.

The driving circuit 310 may drive the touch electrode by a driving signal having the selected frequency (S414). The noise control circuit 330 may transmit a signal to the control circuit 340 so as to change the frequency of the driving signal from the third frequency to the frequency having the lowest noise level. The control circuit 340 may generate a driving signal with the frequency having the lowest noise level and may transmit the same to the driving circuit 310.

Figure 5:
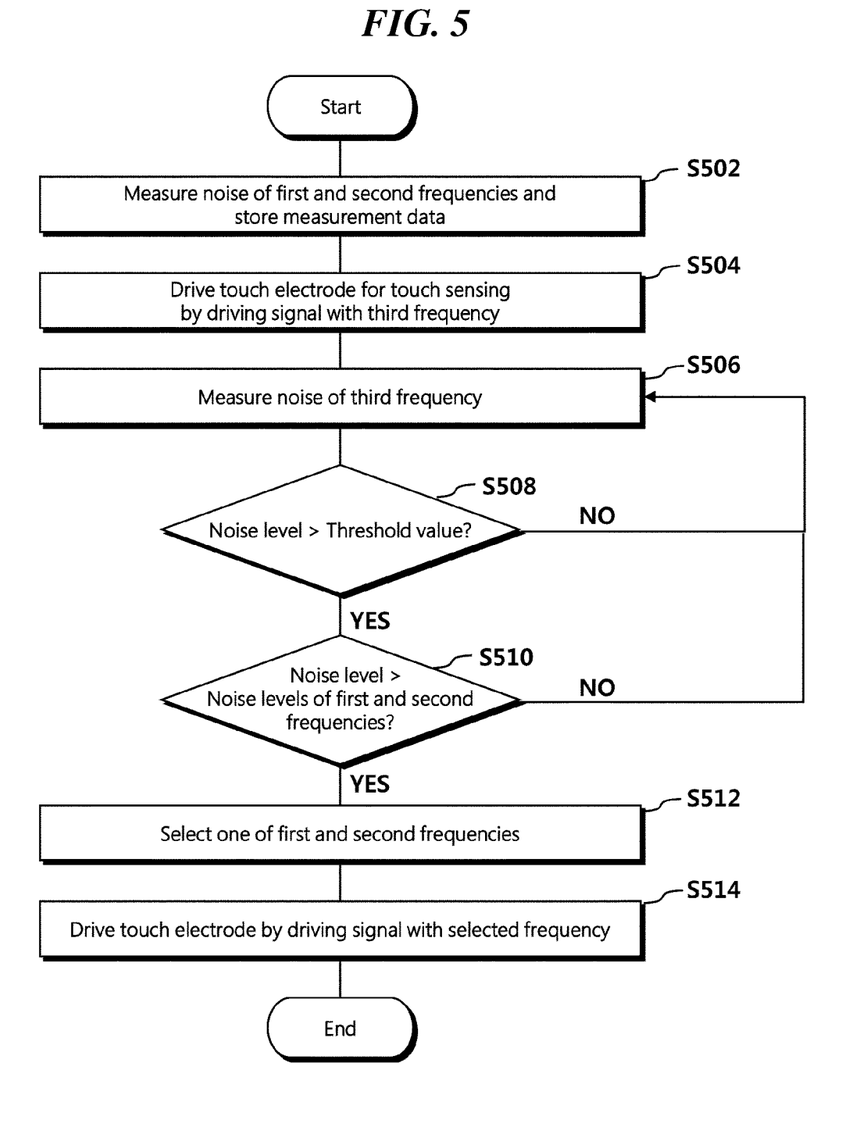
FIG. 5 is a second flowchart of noise avoiding operations according to an embodiment.

FIG. 5 is a second flowchart of noise avoiding operations according to an embodiment.

Referring to FIG. 5, according to an embodiment, if noise of another frequency is more than that of the current frequency of the driving signal, the touch sensing device of the display device may not change the driving signal to have the other frequency.

The noise control circuit 330 may measure noise of first and second frequencies and may store measurement data regarding the result of measuring the same in the storage circuit (S502).

For touch sensing, the driving circuit 310 may drive a touch electrode by a driving signal having a third frequency (S504).

The noise control circuit 330 may measure noise of the third frequency (S506).

The noise control circuit 330 may compare the noise level of the third frequency with a threshold value (S508).

If the noise level of the third frequency is not higher than the threshold value, the noise control circuit 330 may keep measuring noise of the third frequency (NO in S508).

If the noise level of the third frequency is higher than the threshold value (YES in S508), the noise control circuit 330 may compare the noise level of the third frequency with the noise level of the first and second frequencies (S510).

If the noise level of the third frequency is not higher than the noise level of the first and second frequencies, the noise control circuit 330 may repeatedly measure noise of the third frequency (NO in S510).

If the noise level of the third frequency is higher than the noise level of the first and second frequencies (YES in S510), the noise control circuit 330 may select one of the first and second frequencies (S512).

The driving circuit 310 may drive the touch electrode by a driving signal having the selected frequency (S514).

Figure 6:
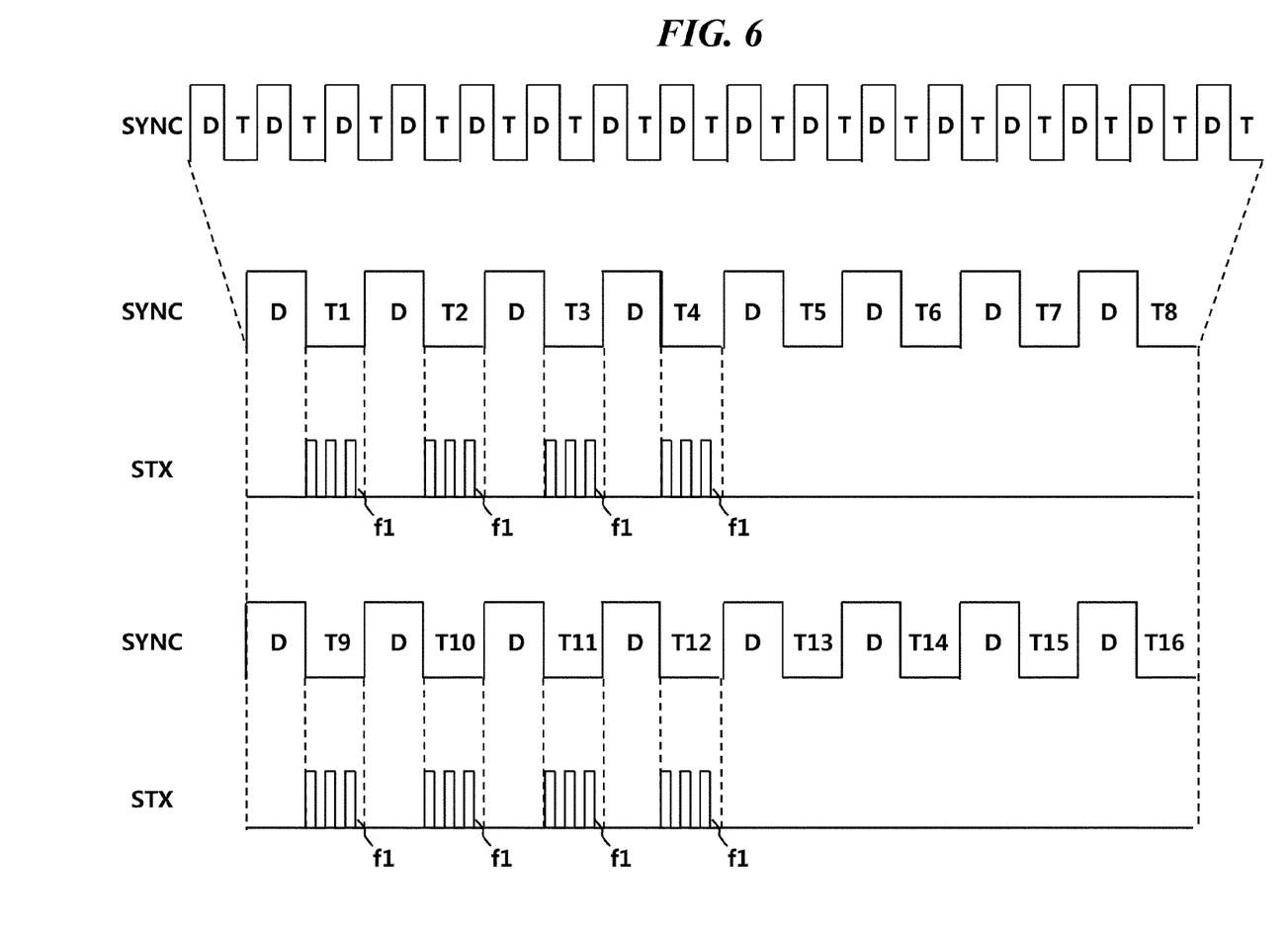
FIG. 6 is a waveform diagram illustrating a driving signal for touch sensing according to an embodiment.

FIG. 6 is a waveform diagram illustrating a driving signal for touch sensing according to an embodiment.

FIG. 6 illustrates a synchronization signal SYNC for instructing a display device to perform a display operation and a touch operation on the basis of time division, and a driving signal STX for driving touch electrodes according to the synchronization signal SYNC.

The synchronization signal SYNC may include a display section D which regulates a display operation and a touch section T which regulates a touch operation. The display and touch may be performed in a first type in which the touch panel is sensed after all lines of the display panel are scanned in one frame, or in a second type in which scanning of specific lines of the display panel and sensing of the touch panel are repeated in one frame. The following description will be made with regard to the second type in which the display and touch are repeated in one frame. Each touch section T in the second type may be referred to as a long horizontal blank (LHB).

A synchronization signal SYNC may include, in each frame, multiple display sections D and multiple touch sections T (multiple LHBs). In this diagram, a synchronization signal SYNC may include, in one frame, 16 display sections D and 16 touch sections T. Respective touch sections T may be labeled T1 to T16.

The driving circuit 310 may drive the touch electrodes in order to sense a touch or the proximity of an external object in multiple touch sections of one frame. For example, the driving circuit 310 may drive the touch electrodes by a driving signal STX having a first frequency f1 in multiple touch sections T1-T4 and T9-T12. The multiple touch sections T1-T4 and T9-T12 for sensing a touch or the proximity of an external object may be positioned adjacent to each other. Alternatively, the multiple touch sections T1-T4 and T9-T12 may be configured, as in this diagram, such that a group of touch sections are positioned to be spaced apart from each other.

Figure 7:
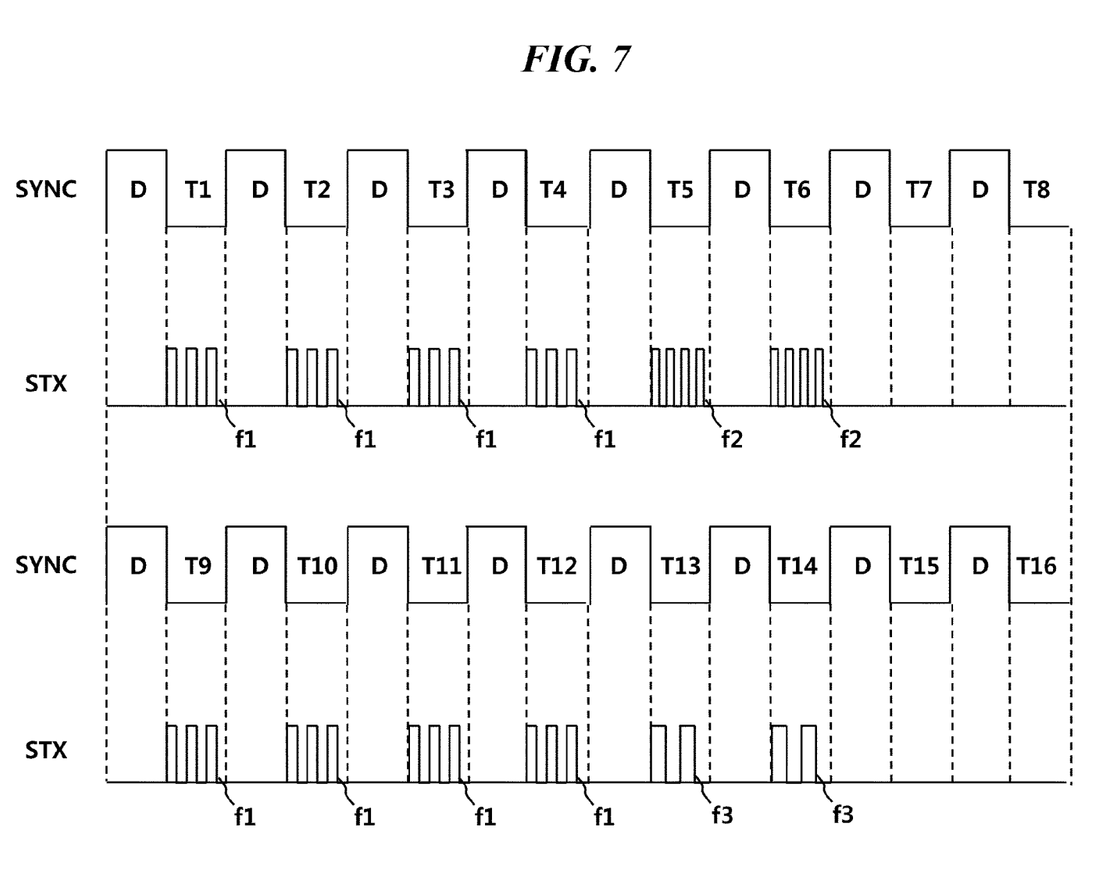
FIG. 7 is a waveform diagram illustrating a driving signal for touch sensing and a driving signal for noise measurement according to an embodiment.

FIG. 7 is a waveform diagram illustrating a driving signal for touch sensing and a driving signal for noise measurement according to an embodiment.

FIG. 7 illustrates a driving signal STX for sensing a touch or the proximity of an external object, and a driving signal STX for noise measurement.

The driving circuit 310 may drive the touch electrodes in order to sense a touch or the proximity of an external object in multiple touch sections of one frame and, on the other hand, may drive the touch electrodes in order to measure noise in other multiple touch sections.

For example, the driving circuit 310 may drive the touch electrodes by a driving signal STX having a first frequency f1 in first multiple touch sections T1-T4 and T9-T12 and, on the other hand, may drive the touch electrodes by a driving signal STX having a second frequency f2 or a driving signal STX having a third frequency f3 in second multiple touch sections T5, T6, T13, and T14.

The second frequency f2 and the third frequency f3 may differ from the first frequency f1. The second frequency f2 may be larger than the first frequency f1, and the third frequency f3 may be smaller than the first frequency f1.

The second multiple touch sections T5, T6, T13, and T14 for noise measurement may be positioned adjacent to each other. Alternatively, the multiple touch sections T1-T4 and T9-T12 may be configured, as in this diagram, such that a group of touch sections are positioned to be spaced apart from each other. The position and combination of touch sections only for sensing a touch or the proximity of an external object and touch sections for measuring noise are not limited thereto, and may be variously configured.

In this regard, each touch section may correspond to a period of time during which a touch or the proximity of a stylus or a finger is sensed. Therefore, the first multiple touch sections T1-T4 and T9-T12 may be assigned to sense a finger, and the second multiple touch sections T5, T6, T13, and T14 may be assigned to sense a stylus.

In this case, the noise measurement and the sensing of a touch or approach of an external object may be simultaneously performed in the second multiple touch sections T5, T6, T13, and T14. For example, noise of the third frequency f3 may be measured in a part of the touch section T13, and a touch or the proximity of the stylus may be sensed in the remaining part thereof. Disposition and combination of touch sections only for sensing a touch or the proximity of an external object and touch sections for measuring noise are not limited thereto, and may be variously set.

What is claimed is:

1. A touch sensing device comprising:
    a driving circuit to drive touch electrodes by frame, each frame comprising multiple display sections, multiple first touch sections, and multiple second touch sections, the driving circuit being configured to drive the touch electrodes by a first driving signal in the first touch sections and to drive the touch electrodes by a second driving signal and a third driving signal in the second touch sections, the first driving signal, the second driving signal, and the third driving signal having different frequencies;
    a sensing circuit configured to sense a touch or a proximity of an external object by using sensing data of the touch electrodes generated according to the first driving signal; and
    a noise control circuit configured to change a frequency of the first driving signal to a frequency of one, having less noise, of the second driving signal and the third driving signal if the sensing data is determined to have noise.

2. The touch sensing device of claim 1, wherein the first touch section or the second touch section is disposed between two display sections so that touch sections and display sections are alternately disposed.

3. The touch sensing device of claim 2, wherein the first touch section corresponds to a long horizontal blank (LHB).

4. The touch sensing device of claim 2, wherein the noise control circuit is configured to compare a noise level of the first driving signal with a noise level of the second driving signal and a noise level of the third driving signal, and to maintain the frequency of the first driving signal if the noise level of the first driving signal is lower than the noise level of the second driving signal and the noise level of the third driving signal.

5. The touch sensing device of claim 1, wherein the second touch section is divided into a section for the second driving signal and a section for the third driving signal, and the first touch section is longer than the section for the second driving signal and the section for the third driving signal.

6. The touch sensing device of claim 5, wherein the driving circuit is configured to individually drive respective touch electrodes in the first touch section, and is configured to short-circuit and drive at least two touch electrodes in the second touch section.

7. The touch sensing device of claim 1, wherein the noise control circuit is configured to generate noise measurement data regarding the second driving signal and the third driving signal, and is configured to select one having less noise among the second driving signal and the third driving signal according to the noise measurement data.

8. The touch sensing device of claim 7, further comprising a storage circuit in which the noise measurement data is stored, and the noise control circuit is configured to determine a frequency having a least noise from the stored noise measurement data.

9. The touch sensing device of claim 7, wherein the noise measurement data is generated and stored before a touch electrode from the touch electrodes is driven by the first driving signal.

10. The touch sensing device of claim 1, wherein the noise control circuit is configured to determine that, if a noise level exceeds a threshold value, a response signal to the first driving signal from a touch electrode from the touch electrodes has noise.

11. The touch sensing device of claim 1, wherein a touch or the proximity of a finger is sensed in the multiple first touch sections.

12. A method for avoiding noise in a touch sensing device, the method comprising:
    driving a touch electrode by a driving signal having a first frequency for noise measurement;
    receiving a response signal having the first frequency in response to the driving signal having the first frequency;
    acquiring measurement data regarding a result of measuring noise of the response signal having the first frequency;
    driving the touch electrode by a driving signal having a second frequency in order to sense a touch or a proximity of an external object;
    determining whether or not a response signal to the driving signal having the second frequency has noise; and
    determining, when the response signal to the driving signal having the second frequency is determined to have the noise, whether or not to use the driving signal having the first frequency to sense the touch or approach of an external object according to the measurement data for the first frequency.

13. The method of claim 12, wherein a time during which the touch electrode is driven by the driving signal having the first frequency is shorter than a time during which the touch electrode is driven by the driving signal having the second frequency.

14. The method of claim 13, wherein, in the driving of the touch electrode by the driving signal having the first frequency, at least two touch electrodes are short-circuited and driven.

15. The method of claim 12, wherein the touch electrode is driven by the driving signal having the second frequency in a long horizontal blank (LHB).

* * * * *